United States Patent Office.

EDWARD HEYLYN, OF ROCHESTER, NEW YORK.

Letters Patent No. 91,537, dated June 22, 1869.

---

IMPROVED CEMENT FOR CALKING SHIPS, AND OTHER PURPOSES.

---

The Schedule referred to in these Letters Patent and making part of the same.

---

*To all whom it may concern:*

Be it known that I, EDWARD HEYLYN, of the city of Rochester, county of Monroe, and State of New York, have invented a new Cement for Calking the Seams of the Decks of Ships, and for coating the bottoms and sides of ships, and for stopping all holes and cracks in the same; also for lining wooden or other cisterns, and for covering the roofs of houses and barns, the said cement being water-proof; and as a cement to be applied to brick-work when required to resist water, and for coating all kinds of wood-work when the same requires to be protected from the action of water; and I do hereby declare that the following is a full and exact description, to wit:

To enable others skilled in the art to make and use my invention, I will proceed to describe its manufacture, and way to use it.

Have an iron pot or kettle set in brick-work, so as to avoid danger of the composition igniting whilst being manufactured. Having built a fire under the same, place therein the following materials:

Forty-six pounds of rosin, and five pounds of linseed or other oil or grease. Then, when nearly melted, put in eighty-four pounds of dry calcined plaster of Paris, twenty pounds of white sand or brown sand, and twenty pounds of the refuse matter from the pipes and retorts of gas-works, said dust being both of a brown and black color. Let them boil, and whilst boiling mix the ingredients by stirring and mixing, with an iron fork with a wooden handle, and when all mixed, pour the same into casks or moulds ready for use.

To apply the same to the decks of vessels, melt a portion of cement over a small furnace, and run into the places required to be calked with an iron (spouted) ladle, and take off all superfluous parts with a hot trowel.

For lining cisterns, and covering roofs and bottoms of ships, melt in a portable furnace and kettle, and apply the cement with swabs or brushes, and finish off with hot trowel, as the case requires. And if the cement requires to run more freely, add a little oil on melting the same.

What I claim as my invention, is—

The cement or composition above described, for the purpose of calking the seams and bolt-heads and other openings in the decks of vessels, and for coating and lining wooden vessels, and other similar purposes.

EDWARD HEYLYN.

Witnesses:
 MAURICE H. LEMON,
 JAS. WM. WORTHINGTON.